United States Patent
Wang et al.

(10) Patent No.: US 10,514,689 B2
(45) Date of Patent: *Dec. 24, 2019

(54) REMOTE CONTROL METHODS AND SYSTEMS

(71) Applicant: SZ DJI TECHNOLOGY CO., LTD., Shenzhen (CN)

(72) Inventors: Hong Tao Wang, Shenzhen (CN); Zhi Cong Huang, Shenzhen (CN)

(73) Assignee: SZ DJI TECHNOLOGY, CO., LTD., Shenzhen (CN)

( * ) Notice: Subject to any disclaimer, the term of this patent is extended or adjusted under 35 U.S.C. 154(b) by 82 days.

This patent is subject to a terminal disclaimer.

(21) Appl. No.: 15/850,710

(22) Filed: Dec. 21, 2017

(65) Prior Publication Data

US 2018/0107208 A1    Apr. 19, 2018

Related U.S. Application Data

(63) Continuation of application No. 15/190,118, filed on Jun. 22, 2016, now Pat. No. 9,864,370, which is a
(Continued)

(30) Foreign Application Priority Data

Oct. 9, 2013    (CN) .......................... 2013 1 0468739

(51) Int. Cl.
*G05D 1/00* (2006.01)
*H04L 1/00* (2006.01)
(Continued)

(52) U.S. Cl.
CPC .......... *G05D 1/0022* (2013.01); *A63H 27/02* (2013.01); *A63H 30/04* (2013.01); *G05D 1/0038* (2013.01);
(Continued)

(58) Field of Classification Search
CPC .... G05D 1/0022; G05D 1/0038; A63H 27/02; A63H 30/04; H04J 11/0023;
(Continued)

(56) References Cited

U.S. PATENT DOCUMENTS 5,499,388 A    3/1996 Song
8,432,950 B2   4/2013 Tanaka et al.
(Continued)

FOREIGN PATENT DOCUMENTS

CN    200976108 Y    11/2007
CN    101445156 A     6/2009
(Continued)

OTHER PUBLICATIONS

The United States Patent and Trademark Office (USPTO) Notice of Allowance for U.S. Appl. No. 14/542,417 dated Apr. 8, 2016.
(Continued)

*Primary Examiner* — Gertrude Arthur Jeanglaude
(74) *Attorney, Agent, or Firm* — Anova Law Group, PLLC

(57) ABSTRACT

An unmanned aerial vehicle (UAV) includes a first communication module, a second communication module, and one or more processors. The first communication module is configured to directly receive control data from a controlling terminal via a first communication link and the control data is used to control operations of the UAV. The second communication module is configured to transmit feedback data to a monitoring terminal via a second communication link. The monitoring terminal is located remotely from the UAV. The one or more processors are, individually or collectively, configured to terminate and reactivate the first wireless communication link based on one or more predetermined criteria.

18 Claims, 11 Drawing Sheets

Related U.S. Application Data continuation of application No. 14/542,417, filed on Nov. 14, 2014, now Pat. No. 9,397,782, which is a continuation of application No. 14/260,173, filed on Apr. 23, 2014, now Pat. No. 8,924,044, which is a continuation of application No. PCT/CN2014/073727, filed on Mar. 19, 2014.

(51) Int. Cl.

| | | |
|---|---|---|
| *A63H 30/04* | (2006.01) | |
| *A63H 27/00* | (2006.01) | |
| *H04J 11/00* | (2006.01) | |
| *H04L 29/06* | (2006.01) | |
| *G08C 15/02* | (2006.01) | |
| *G08C 15/06* | (2006.01) | |

(52) U.S. Cl.
CPC ........ *H04J 11/0023* (2013.01); *H04L 1/0015* (2013.01); *H04L 1/0025* (2013.01); *H04L 69/28* (2013.01); *B64C 2201/146* (2013.01); *G08C 15/02* (2013.01); *G08C 15/06* (2013.01); *G08C 2201/42* (2013.01)

(58) Field of Classification Search
CPC ..... H04L 1/0015; H04L 1/0025; H04L 69/28; B64C 2201/146; G08C 15/02; G08C 15/06; G08C 2201/42
USPC .............................................................. 701/2
See application file for complete search history.

(56) References Cited

U.S. PATENT DOCUMENTS

| | | | |
|---|---|---|---|
| 8,924,044 B1 * | 12/2014 | Wang ................... | G05D 1/0022 340/961 |
| 9,397,782 B2 | 7/2016 | Wang et al. | |
| 2003/0093187 A1 | 5/2003 | Walker | |
| 2005/0090945 A1 | 4/2005 | Bodin et al. | |
| 2006/0271251 A1 | 11/2006 | Hopkins | |
| 2007/0244608 A1 | 10/2007 | Rath et al. | |
| 2007/0246610 A1 | 10/2007 | Rath et al. | |
| 2012/0089274 A1 | 4/2012 | Lee et al. | |
| 2015/0147976 A1 | 5/2015 | Wang et al. | |

FOREIGN PATENT DOCUMENTS

| | | |
|---|---|---|
| CN | 201262709 Y | 6/2009 |
| CN | 101561681 A | 10/2009 |
| CN | 101704411 A | 5/2010 |
| CN | 102508493 A | 6/2012 |
| CN | 102637023 A | 8/2012 |
| CN | 202583884 U | 12/2012 |
| CN | 102981508 A | 3/2013 |
| CN | 202771262 U | 3/2013 |
| CN | 103217983 A | 7/2013 |
| CN | 103543752 A | 1/2014 |
| JP | S57139819 A | 8/1982 |
| KR | 20070025198 A | 3/2007 |

OTHER PUBLICATIONS

The European Patent Office (EPO) Search Report and Opinion for Application No. 14852645.2 dated Jun. 3, 2016.
The World Intellectual Property Organization (WIPO) International Search Report and Written Opinion for PCT/CN2014/073725 dated Jul. 10, 2014.
The United States Patent and Trademark Office (USPTO) Notice of Allowance for U.S. Appl. No. 14/542,417 dated Mar. 24, 2016.
The United States Patent and Trademark Office (USPTO) Notice of Allowance for U.S. Appl. No. 14/260,173 dated Oct. 17, 2014.
The United States Patent and Trademark Office (USPTO) Notice of Allowance for U.S. Appl. No. 14/260,173 dated Nov. 13, 2014.
The United States Patent and Trademark Office (USPTO) Office Action for U.S. Appl. No. 14/260,173 dated Jul. 17, 2014.
The United States Patent and Trademark Office (USPTO) Office Action for U.S. Appl. No. 14/542,417 dated Nov. 3, 2015.

* cited by examiner

REMOTE CONTROL METHODS AND SYSTEMS

CROSS-REFERENCE

This application is a continuation application of U.S. application Ser. No. 15/190,118, filed on Jun. 22, 2016, which is a continuation application of U.S. application Ser. No. 14/542,417, filed on Nov. 14, 2014, now U.S. Pat. No. 9,397,782, which is a continuation application of U.S. application Ser. No. 14/260,173, filed on Apr. 23, 2014, now U.S. Pat. No. 8,924,044, which is a continuation of International Application No. PCT/CN2014/073727, filed on Mar. 19, 2014, which claims priority from Chinese Patent Application No. 201310468739.0, filed on Oct. 9, 2013, all of which applications are hereby incorporated by reference in their entirety.

BACKGROUND OF THE DISCLOSURE

Modern unmanned aerial vehicles (UAVs), with their small sizes and flexibility, have become widely used in a variety of military and civilian applications such as surveillance and tracking, remote sensing, search and rescue, scientific research and the like. UAVs are typically controlled wirelessly by remote control equipments and/or by onboard control programs.

Most UAVs have at least two wireless communication modules. One of the wireless communication modules can be configured to receive control data transmitted by a controlling terminal. Based upon the received control data, various operational state of a UAV may be adjusted including position, attitude, speed, and the like. Another wireless module can be configured to transmit feedback data to a monitoring terminal. The feedback data may include an operational state of an UAV, sensor data acquired by the UAV (e.g., image data captured by an onboard camera), and other similar data. The monitoring terminal can include wireless-enabled computing devices (e.g., laptops, server, or other recording/storage devices).

Frequently, the same frequency bands (e.g., the 2.4 GHz band) are used for both control data transmission and feedback data transmission. However, interference can occur when the control data is being transmitted at the same time as the feedback data over a shared frequency band, causing poor data reception, disruption of normal operations or even loss of control of the UAV.

SUMMARY OF THE DISCLOSURE

A need exists for reducing interference between simultaneous transmissions of data. The present disclosure provides methods, systems and devices for reducing interference among simultaneous transmissions of data. In some embodiments, the systems, methods, and devices described herein provide dynamic switching between a plurality of communication links based on a condition of the communication environment. Advantageously, the dynamic communication link switching disclosed herein can be used to prevent interference and improve robustness of data transmission.

According to an aspect of the present disclosure, a monitoring terminal is provided. Said monitoring terminal can comprise a first communication module capable of two-way communication with a controlled terminal via a first communication link between the first communication module and the controlled terminal at a first frequency band; and a second communication module configured to receive control data from a controlling terminal via a second communication link that does not interfere with the first communication link. In some embodiments, the control data is conveyed via the first communication link to the controlled terminal, thereby controlling operation of the controlled terminal using the control data generated at the controlling terminal.

In some embodiments, the controlled terminal is a movable object. The movable object can be an unmanned aerial vehicle (UAV). The control data can be operable for controlling propulsion of the movable object. Alternatively or additionally, the control data can be operable for controlling a payload carried by the movable object. In general, the controlling data can be operable for controlling an aspect of the controlled terminal.

In some embodiments, the controlling terminal is capable of transmitting the control data to the controlled terminal via a third communication link, thereby controlling activity of the controlled terminal. The third communication link can operate at the first frequency band. In some embodiments, the controlling terminal is not capable of receiving data from the controlled terminal.

In some embodiments, the two-way communication via the first communication link can occur through a time division multiplexing (TDM) scheme. The first communication module can receive data from the controlled terminal through a subset of cyclically repeating TDM frames. In some embodiments, the two-way communication via the first communication link can occur through a frequency division multiplexing (FDM) scheme In some embodiments, the first communication module is configured to receive feedback data from the controlled terminal. The feedback data can include sensor data. The sensor data can include image sensor data. In some embodiments, the feedback data is indicative of an operational state, a position, or an attitude of the controlled terminal.

In some embodiments, the monitoring terminal described herein further comprises a display configured to show the feedback data received from the controlled terminal via the first communication link. The display can be configured to show an image captured by one or more image sensors of the controlled terminal. The display can also be configured to show information indicative of the position of the controlled terminal.

In some embodiments, the second communication link is a wired communication link. In some other embodiments, the second communication link is a wireless communication link using a second frequency band that is different from the first frequency band. In some embodiments, the second communication module can include a trainer interface configured to receive the control data from a trainer interface of the controlling terminal.

According to another aspect of the present disclosure, a system is provided for controlling a controlled terminal. The system comprises the monitoring terminal described herein; the controlled terminal, wherein the controlled terminal is configured to send feedback data to the first communication module via the first communication link; and the controlling terminal.

In some embodiments, the controlling terminal comprises a processor that causes the control data to be transmitted via the second communication link, while preventing the control data to be transmitted directly to the controlled terminal via a third communication link.

In some embodiments, the controlling terminal includes a user interface capable of receiving a user input that aids in the generation of the control data, such as a joystick, a touchscreen, or the like. In some embodiments, the user interface is capable of displaying the feedback data received from the controlled terminal.

According to another aspect of the present disclosure, a method for communicating with a controlled terminal is provided. The method comprises receiving, from a controlled terminal, feedback data via a first communication link; receiving, from a controlling terminal, control data via a second communication link that does not interfere with the first communication link; and sending, to the controlled terminal, the control data via the first communication link, thereby controlling operation of the controlled terminal using the control data generated at the controlling terminal.

In some embodiments, the controlled terminal is a movable object. The movable object can be an unmanned aerial vehicle (UAV). The control data can be operable for controlling a component of the movable object. Alternatively or additionally, the control data can be operable for controlling a payload carried by the movable object.

In some embodiments, the controlling terminal is capable of transmitting the control data to the controlled terminal via a third communication link, thereby controlling activity of the controlled terminal. The third communication link can operate at a frequency band that is the same as that used by the first communication link. In some embodiments, the controlling terminal is not capable of receiving data from the controlled terminal.

In some embodiments, the two-way communication via the first communication link can occur through a time division multiplexing (TDM) scheme. The first communication module can receive data from the controlled terminal through a subset of cyclically repeating TDM frames. In some embodiments, the two-way communication via the first communication link can occur through a frequency division multiplexing (FDM) scheme In some embodiments, the feedback data can include sensor data. The sensor data can include image sensor data. In some embodiments, the feedback data is indicative of an operational state, a position, or an attitude of the controlled terminal.

In some embodiments, the method described herein further includes providing a display configured to show the feedback data received from the controlled terminal via the first communication link. The display can be configured to show an image captured by one or more image sensors of the controlled terminal. The display can also be configured to show information indicative of the position of the controlled terminal.

In some embodiments, the feedback data is received via the first communication link at a first frequency band and the control data is sent to the controlled terminal at the first frequency band. In some embodiments, the control data is received, from the controlling terminal, at a second frequency band that is different from the first frequency band. In some embodiments, the control data is received, from the controlling terminal, using a wired communication link. In some embodiments, the control data is received, from the controlling terminal, via a trainer interface.

According to another aspect of the present disclosure, a method of controlling a controlled terminal is provided. The method comprises receiving control data from a controlling terminal via a first communication link at a first frequency band, thereby controlling activity of the controlled terminal using the control data generated at the controlling terminal; transmitting feedback data to a monitoring terminal via a second communication link at the first frequency band; determining, with aid of a processor, when the receiving and transmitting are simultaneously occurring at the same first frequency band; and effecting termination of the first communication link when the receiving and transmitting are simultaneously occurring at the same first frequency band, and causing the control data from the controlling terminal to be transmitted to the monitoring terminal via a third communication link that does not interfere with the first communication link or the second communication link.

In some embodiments, the controlled terminal is a movable object. The movable object can be an unmanned aerial vehicle (UAV). The control data can be operable for controlling propulsion of the movable object. Alternatively or additionally, the control data can be operable for controlling a payload carried by the movable object.

In some embodiments, the method further comprises causing the control data to be transmitted from the monitoring terminal to the controlled terminal using the second communication link. The two-way communication via the second communication link can occur through a time division multiplexing (TDM) scheme. Alternatively, the two-way communication via the second communication link can occur through a frequency division multiplexing (FDM) scheme In some embodiments, the feedback data can include sensor data. The sensor data can include image sensor data. In some embodiments, the feedback data is indicative of an operational state, a position, or an attitude of the controlled terminal.

In some embodiments, the third communication link is a wired communication link. In some other embodiments, the third communication link is a wireless communication link using a second frequency band that is different from the first frequency band. In some embodiments, the third communication link utilizes a trainer interface.

In some embodiments, determining when the receiving and transmitting are simultaneously occurring at the same first frequency band is based on one or more communication environment characteristics. The one or more communication environment characteristics can include at least one of a detected energy level, signal to noise ratio, or error rate.

In some embodiments, effecting the termination of the first communication link can include stopping operation of a communication module associated with the controlling terminal, the communication module operable for transmitting control data to the controlled terminal. Alternatively or additionally, effecting the termination of the first communication link can include stopping operation of a communication module associated with the controlled terminal, the communication module operable for receiving control data from the controlling terminal.

In various embodiments, the processor can resides in the monitoring terminal, the controlled terminal, or the controlling terminal.

It shall be understood that different aspects of the disclosure can be appreciated individually, collectively, or in combination with each other. Various aspects of the disclosure described herein may be applied to any of the particular applications set forth below or data communication between any other types of movable and/or stationary objects. Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

The present disclosure provides remote control systems and methods that reduce the interference among simultaneous transmissions of data. A controlled terminal such as an unmanned aerial vehicle (UAV) can be configured to receive control data from a controlling terminal such as a remote controlling terminal. The control data may be used to control a state or operation of the controlled terminal. For example, the control data can be result in an adjustment of a UAV's position, attitude, speed, acceleration, or the like. The controlled terminal can also be configured to transmit feedback data to a monitoring terminal such as a server at a base station. Feedback data can include an operational state of an UAV, sensor data acquired by the UAV (e.g., image data captured by an onboard camera), and other similar data. However, interference can occur when the transmission of the control data and the transmission of the feedback data take place at the same time over the same frequency band. To prevent interference caused by the simultaneous transmissions of control data and feedback data, the controlling terminal can first transmit the control data to the monitoring terminal using a communication link that does not interfere with the transmission of the feedback data such as over a wired connection or over a wireless connection using a different frequency band. In some embodiments, existing trainer interfaces can be used for such transmission of control data. Subsequently, the monitoring terminal can transmit the control data to the controlled terminal without interfering with the transmission of the feedback data, for example, by using interference avoidance techniques such as time-division multiplexing (TDM) or frequency-division multiplexing (FDM).

Figure 1:
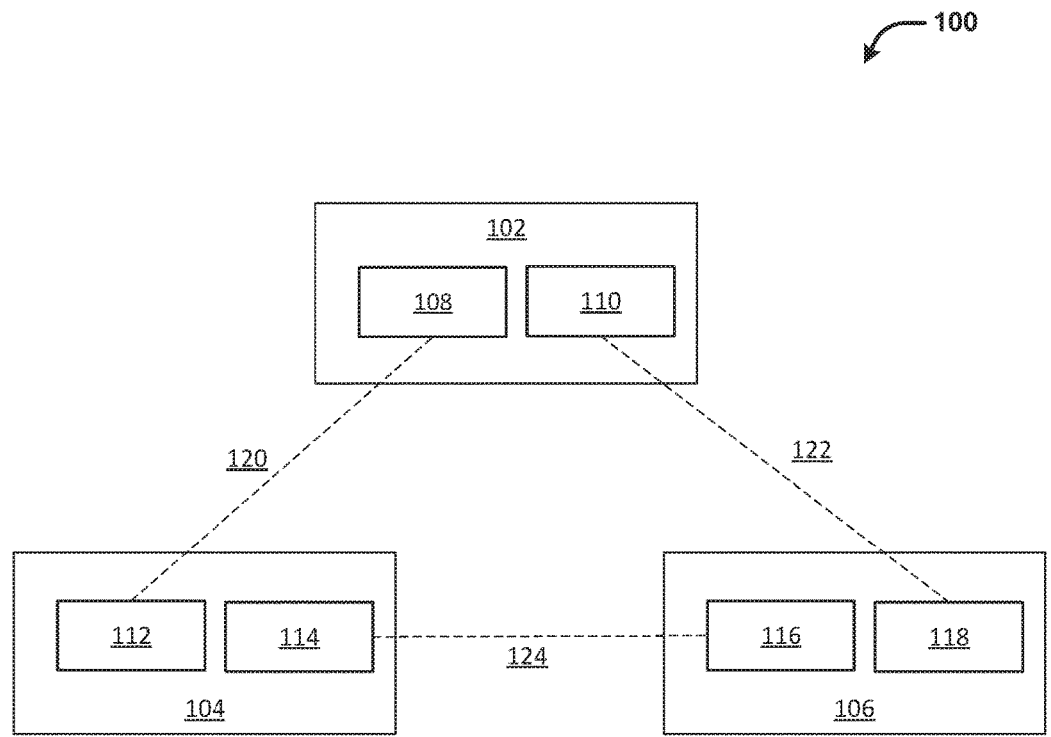
FIG. 1 illustrates an exemplary communication system for implementing the present disclosure, in accordance with an embodiment.

FIG. 1 illustrates an exemplary communication system 100 for implementing the present disclosure, in accordance with an embodiment. The system 100 includes a controlled terminal 102, a controlling terminal 104, and a monitoring terminal 106. The controlled terminal 102 can include any object or device capable of operating according to remotely-transmitted control data as well as providing feedback data. For example, the controlled terminal 102 can include, be a part of, attachable to, or otherwise associated with any movable objects. Such movable objects may include or be included by manned or unmanned vehicle equipped with visual sensor or other types of sensors, robot, or other live or inanimate object usable for performing surveillance and tracking, remote sensing, search and rescue, scientific research, and other functions. Examples of movable objects are further described elsewhere herein.

The controlling terminal 104 can include, be a part of, attachable to, or otherwise associated with any object or device capable of transmitting remote control instructions or control data to the controlled terminal 102. The control instructions or control data may be generated by the controlling terminal according to inputs provided by a user operating the controlling terminal. Alternatively or additionally, the control data may be generated based on information not provided by the users such as state information of the controlled terminal. In some instances, the control data may be generated automatically without any user inputs. The controlling terminal can include one or more computing devices in base station. Alternatively, the controlling terminal can be a handheld or wearable device. For example, the controlling terminal can include a server, desktop, smartphone, tablet, laptop, glasses, gloves, helmet, or suitable combinations thereof. The controlling terminal can include a user interface, such as a keyboard, mouse, joystick, touchscreen, or display for a user to interact with the controlling terminal, such as through manually entered commands, voice control, gesture control, position control (e.g., via a movement, location or tilt of the controlling terminal), or the like.

The monitoring terminal 106 can include, be a part of, attachable to, or otherwise associated with any object or device capable of receiving feedback data from the controlled terminal 102. Furthermore, the monitoring terminal 106 may be configured to display, store, transmit, or otherwise process the received feedback data. For example, the monitoring terminal may include a processor for processing the received data, and a memory for storing the received data. In some embodiments, the monitoring terminal 108 may be configured to transmit the received data, processed or unprocessed, to another device (such as a remote server associated with a remote or cloud storage or service).

The monitoring terminal 106 can include a display unit for viewing information received from the controlled terminal. For example, the monitoring terminal can be configured to display state information of the controlled terminal or a payload carried by the control terminal with respect to position, translational velocity, translational acceleration, orientation, angular velocity, angular acceleration, or any suitable combinations thereof. In some embodiments, the monitoring terminal can be configured to display information acquired by the controlled terminal and/or the payload carried by the controlled terminal. The payload carried by the controlled terminal may include various sensors such as global positioning system (GPS) sensors, motion sensors, inertial sensors, proximity sensors, image sensors, pressure sensors, thermo sensors, chemical sensors, and the like.

In an embodiment, unlike the controlling terminal 104, the monitoring terminal 106 does not have an interface for receiving user commands or instructions in order to generate the control date for the controlled terminal. Instead, the monitoring terminal 106 is primarily used for displaying, storing and/or processing the feedback data received from the controlled terminal 102. However, in alternative embodiments, the monitoring terminal 106 may also include such a user interface for providing user control to the controlled terminal.

In various embodiments, the control data can include any information provided to the controlled terminal. In some embodiments, such information may be usable for controlling an aspect of the controlled terminal such as an operation of a component of the controlled terminal. The control data may be used, for example, to move the controlled terminal, a payload carried by the controlled terminal, and/or a component of the controlled terminal along with respect to one, two or more of six degrees of freedom (e.g., three degrees of freedom in translation and three degrees of freedom in rotation). For instance, the control data may include information for adjusting the position, attitude, speed, or acceleration of the controlled terminal and/or any component thereof, controlling a propulsion unit of the controlled terminal, causing physical transformation or restructuring of the controlled terminal, the payload carried by the controlled terminal or a component of the controlled terminal. For instance, the control data may include instructions for turning on or off a sensor carried by the controlled terminal, starting or stopping a device (e.g., rotor) or process running on the controlled terminal, and the like. As another example, the control data may be used to control the operations of a payload (e.g., image capturing device) carried by the controlled terminal. Such operations may include, for example, taking still or moving pictures, zooming in or out, turning on or off, switching imaging modes, change image resolution, changing focus, changing depth of field, changing exposure time, changing viewing angle or field of view, and the like. It is appreciated that the term "control data" is to be interpreted broadly to include any information that is provided to the controlled terminal by a remote terminal (e.g., controlling terminal, monitoring terminal), not limited to information that is useful for controlling the controlled terminal. For example, the control data may include synchronization information, error information and other information usable for establishing, maintaining or terminating the communication between the controlled terminal and a remote device such as the controlled terminal.

In some instances, control data from the controlling terminal may include instructions related to the spatial disposition, movements, actuations, or controls of the movable object, carrier and/or payload. For example, the control data may result in a modification of the location and/or orientation of the movable object (e.g., via control of one or more propulsion mechanisms), or a movement of the payload with respect to the movable object (e.g., via control of a carrier). In some instances, the controlled terminal can include a propulsion system that includes one or more rotors configured to provide a lift or thrust for the controlled terminal. In such cases, the control data can be used to control the rotational speed or angle the one or more rotors. The control data from the controlling terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In various embodiments, the feedback data can include any information transmitted by the controlled terminal. In some cases, the feedback data can include information about a state of the controlled terminal or a component thereof, data (e.g., sensor data) acquired by the controlled terminal, and the like. Such feedback data may be indicative of an operational state of the controlled terminal or an environment surrounding the controlled terminal. Exemplary feedback data can include information about the speed, acceleration, position, altitude, or the like of the controlled terminal at any given point in time or during a given period of time. The feedback data can also include information acquired or collected by sensors onboard the controlled terminal such as visual or audio data, GPS information, proximity information, and the like. The sensor data provided by the controlled terminal can be used to control the spatial disposition, velocity, and/or orientation of the controlled terminal. Alternatively, the sensor data can be used to provide data regarding the environment surrounding the movable object, such as weather conditions, proximity to potential obstacles, location of geographical features, location of manmade structures, and the like. Additionally, the feedback data may include information usable for establishing, maintaining or terminating the communication with a remote device such as the monitoring terminal.

As illustrated in FIG. 1, the controlled terminal 102 can include a first communication module 108 and a second communication module 110. The controlling terminal 104 can include a first communication module 112 and a second communication module 114. The monitoring terminal 106 can include a first communication module 116 and a second communication module 118.

The first communication module 108 of the controlled terminal 102 and the first communication module 112 of the controlling terminal 104 can be configured to communicate over a communication link 120. The communication link 120 may also be referred to as a controlled-controlling link for enabling communication between the controlled terminal and the controlling terminal. Typically, the communication link 120 is unilateral, allowing only control data to be transmitted from the controlling terminal 104 to the controlled terminal 102. In such cases, the first communication module 112 of the controlling terminal 104 may be configured to function only as a transmitter while the first communication module 108 of the controlled terminal 102 may be configured to function only as a receiver. In some other cases, the communication link 120 may be bi-directional, allowing data to flow in both directions between the controlled terminal 102 and the controlling terminal 104. In such cases, the first communication module 112 of the controlling terminal 104 and the first communication module 108 of the controlled terminal 102 may each be capable of transmitting and receiving data.

The second communication module 110 of the controlled terminal 102 and the second communication module 118 of the monitoring terminal 106 can be configured to communicate over a communication link 122. The communication link 122 may also be referred to as a controlled-monitoring link for enabling communication between the controlled terminal and the monitoring terminal. In an embodiment, the communication link 122 is bi-directional, allowing both feedback data to be transmitted from the controlled terminal 102 to the monitoring terminal 106 and control data to be transmitted from the monitoring terminal 106 to the controlled terminal 102. As such, the second communication module 110 of the controlled terminal 102 and the second communication module 118 of the monitoring terminal 106 may each include both a transmitter and a receiver, or a transceiver. In some embodiments, the communication link 122 is configured to support the implementation of time-division multiplexing (TDM), frequency-division multiplexing (FDM) or other techniques to facilitate bi-direction transmissions of data. In a typical embodiment, the monitoring terminal 106 does not generate or is incapable of generating the control data to be transmitted to the controlled terminal 102. Instead, such control data is provided by the controlling terminal 104. In other embodiments, the monitoring terminal 106 may be capable of generating control data similar to the controlling terminal 104.

In some embodiments, the control data provided by the controlling terminal 104 may be transmitted without modification to the controlled terminal 102. In other embodiments, the control data provided by the controlling terminal 104 may be modified or otherwise processed by the monitoring terminal 106 before being transmitted to the controlled terminal 102. For example, such modification or processing may be based on the feedback data received from controlled terminal 102.

Alternatively, the monitoring terminal 106 may generate its own control data. For example, the monitoring terminal 106 may provide a user interface for receiving user control of the controlled terminal. Based on such user control, the monitoring terminal 106 may generate control data. In other embodiments, the control data may also be generated based the feedback data received from the controlled terminal 102, data received from other sources, or any combination thereof. Such control data generated by the monitoring terminal 106 may be provided to the controlled terminal 102 in addition to or instead of the control data provided by the controlling terminal 104.

Typically, the transmission medium used for the communication link 120 or 122 is wireless such as radio, microwave, infrared, satellite, and the like. In other instances, the transmission medium used for the communication link 120 or 122 is wired such as twisted-pair wire, cable, fiber-optic cable, and the like. In other instances, a combination of wireless and wired media may be used for the communication link 120 or 122.

The second communication module 114 of the controlling terminal 104 and the first communication module 116 of the monitoring terminal 106 can be configured to communicate over a communication link 124. The communication link 124 may also be referred to as a controlling-monitoring link for enabling communication between the controlling terminal and the monitoring terminal. The communication link 124 is typically unilateral, allowing control data to be transferred from the controlling terminal 104 to the monitoring terminal 106. In other instances, communication link 124 may be bi-directional. In some embodiments, the communication link may be established using trainer interfaces or trainer ports. Such trainer interfaces are typically provided by remote controlling terminals to allow two remote controlling terminals to be physically connected to each other via a trainer cord. One of these two devices may be a trainer device while the other may be a trainee device. By connecting the two devices by their respective trainer interfaces, control commands from one of the devices can be transferred, via the trainer cord, to the other device. In some cases, the trainee commands can be transferred to the trainer device via the trainer cord and the trainer device can decide whether to transmit the trainee commands to a remotely-controlled object (e.g., a UAV) or to instead transmit commands generated by the trainer device, so as to correct or prevent mistakes caused by the trainee commands (e.g., malfunction or even crash of a UAV). In other cases, the trainer commands can be transferred to the trainee device via the trainer cord to override the trainee commands as the control commands. Besides trainer ports, other suitable data input/output ports, such as Universal Serial Bus (USB) ports, parallel or serial ports, may also be used to transfer the control data from the controlling terminal to the monitoring terminal. In various embodiments, the trainer interface discussed herein may support wired or wireless communication protocols. For example, the communication link between two trainer interfaces can be a wireless communication link instead of a training cord or cable.

The use of existing ports such as the trainer ports to transmit control data between the controlling terminal 104 and the monitoring terminal 106 can advantageously lower the cost of implementing the present disclosure, avoid duplicate development efforts, and reduce the complexity the present disclosure since some of such ports are typically provided by default by the manufacturer of the terminals. However, it is understood that the use of such existing ports is neither necessary nor required for the present disclosure. Any suitable methods of communication may be used to transfer the control data from the controlling terminal to the monitoring terminal as long as the method reduces the interference between simultaneous transmissions of control data and feedback data. In an embodiment, the communication link 122 for transferring the feedback data can be a wireless (e.g., radio) link whereas the communication link 124 for transferring the control data can be a wired link (e.g., trainer cord). In another embodiment, the communication link 122 for transferring the feedback data and the communication link 124 for transferring the control data can both be wireless (e.g., radio) links but using different frequency bands, with no overlap in the radio spectrum. For example, the communication link 122 may use one of the industrial, scientific and medical (ISM) radio bands such as the 2.4 GHz band; whereas the communication link 124 may use a different band such as a different ISM band, air band, marine band, amateur radio band, citizen's band, personal radio service band, or other licensed or unlicensed band. In such embodiments, the second communication module 114 of the controlling terminal 104 and the first communication module 116 of the monitoring terminal both support wireless data communication.

In various embodiments, any suitable analog or digital modulation schemes may be used for the transmission of such control and/or feedback data such as pulse-width modulation (PWM), pulse-position modulation (PPM), pulse-amplitude modulation (PAM), phase-shift keying (PSK), frequency-shift keying (FSK), amplitude-shift keying (ASK), quadrature amplitude modulation (QAM), spread-spectrum modulation schemes such as frequency-hopping spread spectrum (FHSS), and the like.

Variations and alternative implementations are also within the scope of this disclosure. For instance, the controlled terminal can have one communication module that is capable of communicating with both the controlling terminal and the monitoring terminal instead of having two communication modules as illustrated in FIG. 1. As another example, any of the communication links described in FIG. 1 cam involve zero, one or more intermediary devices between the transmitting and receiving terminals. Such intermediary devices may or may include network devices that are part of a public or private network such as the Internet, cellular network, wide area network (WAN), local area network (LAN), wireless local area network (WLAN), and the like. For example, the controlling terminal may communicate with the monitoring terminal via one or more such intermediary devices. As another example, the controlling terminal may communicate with the controlled terminal via a network such as a wireless network. Likewise, the controlled terminal may communicate with the monitoring terminal via a network such as a LAN or WLAN.

Figure 2A:
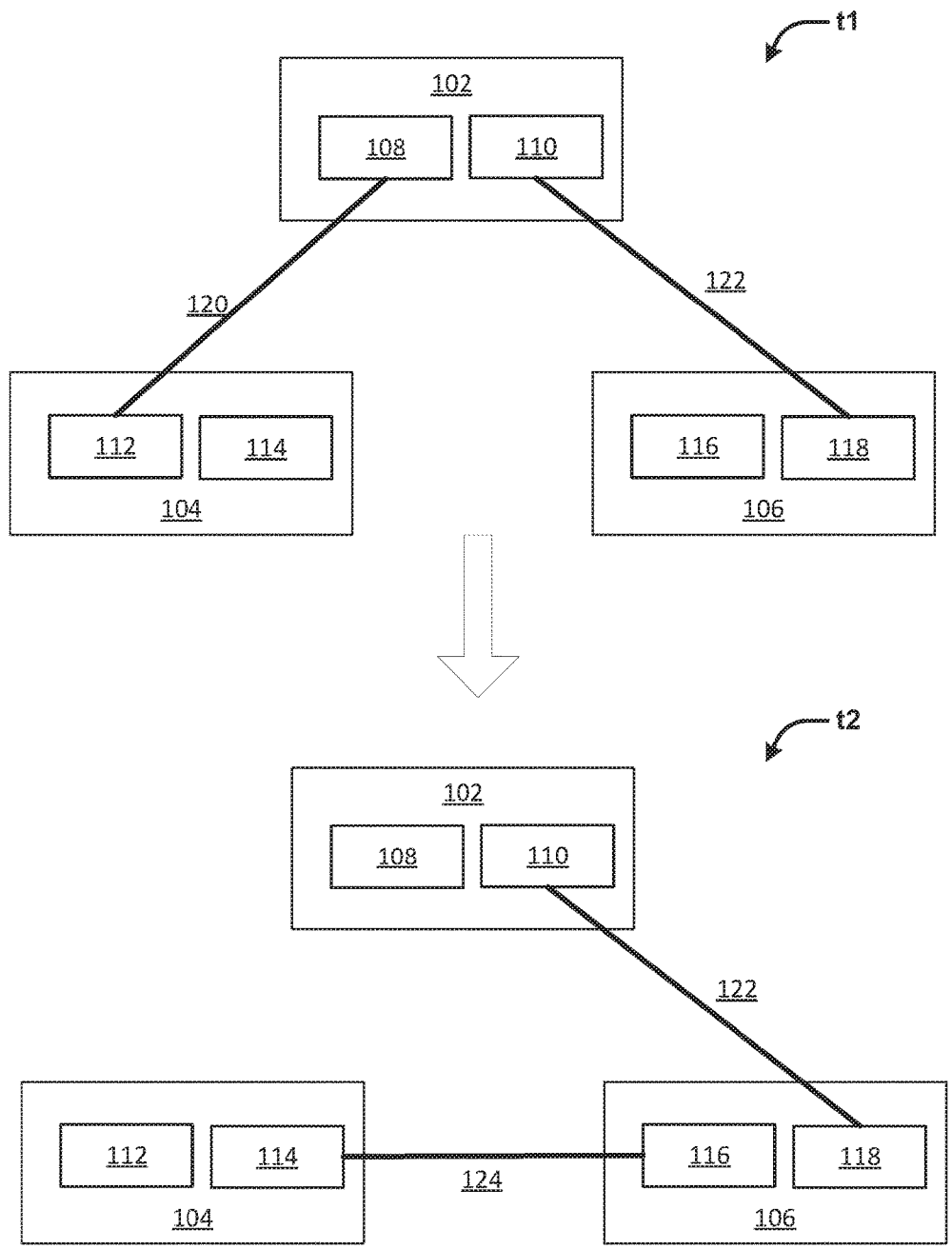
FIG. 2a illustrates an exemplary method for reducing interference between data transmissions, in accordance with an embodiment.

FIG. 2a illustrates an exemplary method for reducing interference between data transmissions, in accordance with an embodiment. The components of FIG. 2a can be similar to those described in connection with FIG. 1. The bolded communication links are used to indicate active links used for data transmissions. As illustrated, at time t1, the controlling terminal 104 transmits, via the communication link 120, control data to the controlled terminal 102. The controlled terminal 102 transmits, via the communication link 122, feedback data to the monitoring terminal 106. The control data can be used for controlling aspects of the controlled terminal such as the position, direction, attitude, speed, and the like. The feedback data can include or be indicative of information related to a state of the controlled terminal and/or the current environment for the controlled terminal. For example, the feedback data can include status data related to the controlled terminal as a whole such as speed, position, attitude, attitude, and the like, or status data related to one or more components associated with the controlled terminal such as motor, battery, memory, processor, and the like. The components may be part of the controlled terminal, or operatively connected with the controlled terminal using a wired or wireless connection. As another example, the feedback data can include sensor data collected by one or more sensors such GPS sensors, motion sensors, inertial sensors, proximity sensors, image sensors, or the like. In various embodiments, the feedback data may include raw, unprocessed data (such as raw sensor data) or processed data (such as a result of a calculation).

When the transmission of control data over the communication link 120 occurs at the same time as the transmission of feedback data over the communication link 122, the communication links may interfere with each other, for example, when the frequency band used by the communication link 120 is the same or overlaps with the frequency band used by the communication link 122. As a result of such interference, the controlled terminal 102 may be unable to receive the correct control data, affecting the operations of the controlled terminal 102. For example, the loss of control of the controlled terminal (e.g., UAV) may result in malfunction or damage of the controlled terminal (e.g., crashing of a UAV). Likewise, due to the interference, the monitoring terminal 106 may be unable to receive the correct feedback data.

To reduce or eliminate such interference, at t2, the communication link 120 can be terminated, closed, or otherwise disabled. In some embodiments, shutting down the communication link 120 can include shutting down or disabling the communication module 112 of the controlling terminal 104 that is configured to transmit the control data to the controlled terminal. Additionally, the communication module 108 of the controlled terminal 102 may also be shut down or disabled to prevent it from receiving the control data. Instead, the controlling terminal 104 can transmit the control data to the monitoring terminal 106 via a communication link 124 that is less likely to interfere with the communication link 122. The monitoring terminal 106 can then transmit the received control data to the controlled terminal 102. In some embodiments, the control data can be transmitted from the monitoring terminal using the same communication link 122 that is used for feedback data transmission. To prevent interference from transmissions sharing of the same communication link, techniques such as time division multiplexing (TDM) or frequency division multiplexing (FDM), or any other suitable techniques may be utilized. For example, in a TDM scheme, time is divided into a plurality of cyclically repeating frames. A certain portion of each frame can be allocated to the transmission of the control data from monitoring terminal to the controlled terminal while another non-overlapping portion of the frame can be allocated to the transmission of the feedback data from the controlled terminal to the monitoring terminal. In a FDM scheme, total bandwidth of the transmission medium of the communication link is divided into a series of non-overlapping frequency sub-bands. Some of the sub-bands can be used for the transmission of the control data from the monitoring terminal to the controlled terminal while other sub-bands can be used for the transmission of the feedback data from the controlled terminal to the monitoring terminal.

An advantage of using a monitoring terminal to transmit control data generated at the controlling terminal is that the monitoring terminal may already have a communication module capable of two-way communication with the controlled terminal. Such a two-way communication module may be equipped with built-in support for implementing interference avoidance algorithms such as TDM and/or FDM to prevent interference of two-way communication.

In some embodiments, the communication link between the controlled terminal and the controlling terminal (i.e., the controlled-controlling link) may be optional. For example, the controlled terminal and the controlling terminal may rely exclusively on the monitoring terminal for relaying control data. Advantageously, such an approach removes the requirement for the controlled terminal and/or the controlling terminal to each maintain a separate and/or dedicated communication module for the control data communication, thereby reducing the size, weight, cost and/or complexity of the controlled terminal and/or controlling terminal.

Figure 2B:
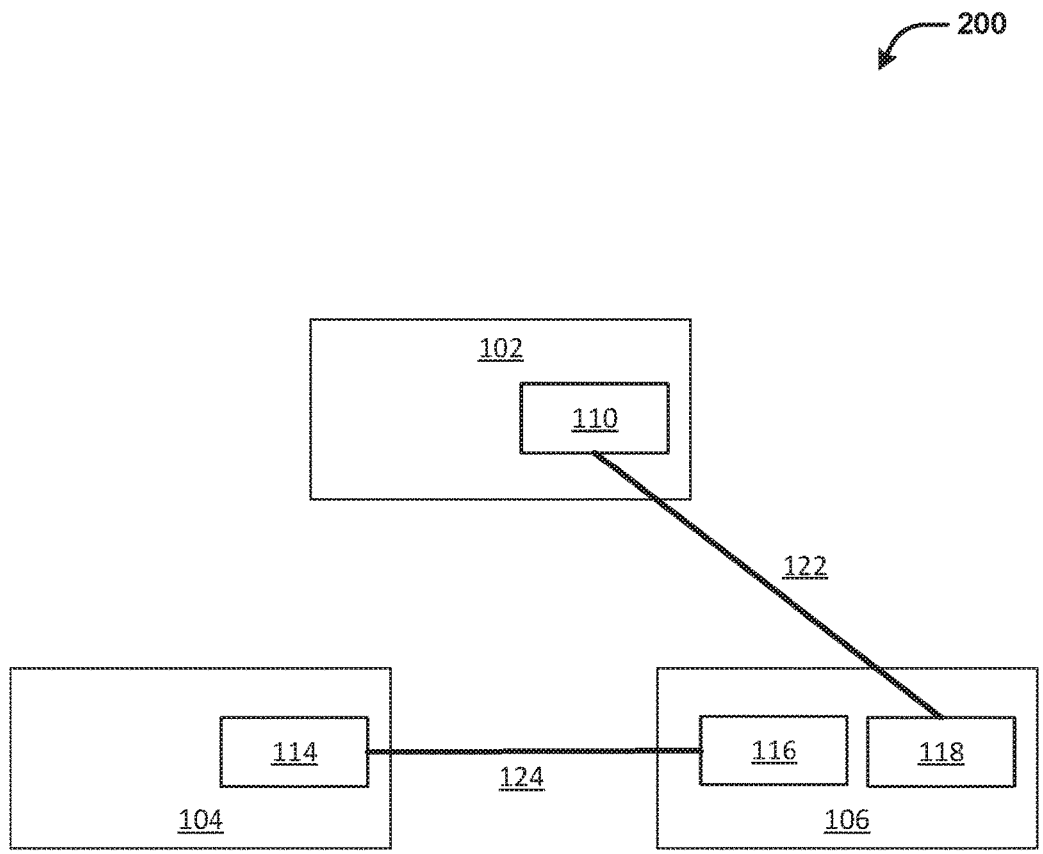
FIG. 2b illustrates an exemplary communication system for implementing the present disclosure, in accordance with an embodiment.

FIG. 2b illustrates an exemplary communication system 200 for implementing the present disclosure, in accordance with an embodiment. The illustrated communication system 200 is similar to the exemplary communication system 100 illustrated in FIG. 1, except that the controlled terminal 102 and the controlling terminal 104 are not equipped with dedicated communication modules that directly communicate with each other. For example, the controlled terminal 102 does not include a communication module, such as the communication module 108 as illustrated in FIG. 1, for receiving control data directly from the controlling terminal 104; likewise, the controlling terminal 104 does not have a communication module, such as the communication module 112 illustrated in FIG. 1, for transmitting control data to the controlled terminal 102.

In the illustrated embodiment, the transmission of control data from the controlling terminal 104 to the controlled terminal 102 is achieved via the monitoring terminal 106, such as discussed in FIG. 2a, at t2. The transmission of control data from the controlling terminal 104 to the monitoring terminal 106 can be achieve via a wired or wireless controlling-monitoring link 124. The controlling-monitoring link 124 may be configured so as not to interfere with the controlled-monitoring link 122 between the controlled terminal 102 and the monitoring terminal 106. For instance, the controlling-monitoring link 124 can be a wired link (e.g., a trainer cord or cable) whereas the controlled-monitoring link 122 can be a wireless link. As another example, the controlling-monitoring link 124 and the controlled-monitoring link 122 can both be wireless links but with different frequency bands or ranges.

Figure 3:
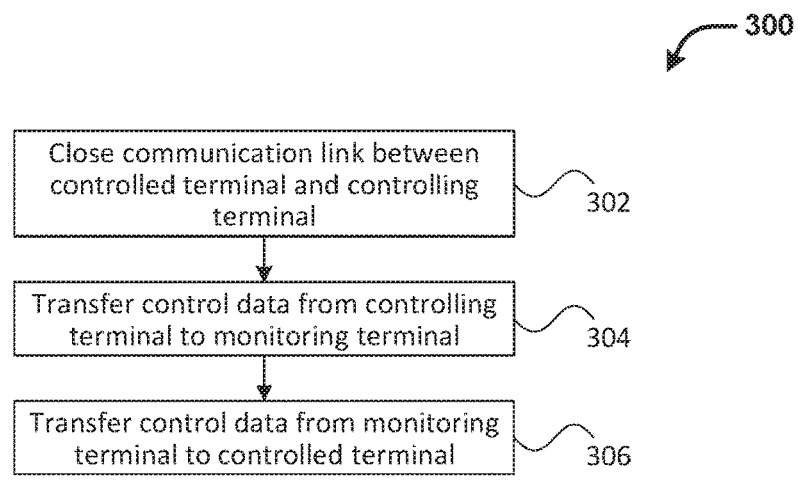
FIG. 3 illustrates an exemplary process for implementing interference avoidance, in accordance with an embodiment.

FIG. 3 illustrates an exemplary process 300 for implementing interference avoidance, in accordance with an embodiment. Aspects of the process 300 may be performed by the controlled terminal 102, the controlling terminal 104 and/or the monitoring terminal 106 discussed in connection with FIGS. 1-2. Some or all aspects of the process 300 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 300 includes terminating or closing 302 a communication link between a controlled terminal and a controlling terminal. The communication link may be used for transferring control data from the controlling terminal to the controlled terminal, similar to the communication link 120 discussed in connection with FIGS. 1-2. Terminating or closing the communication link may include stopping the operation of or otherwise disabling a communication module responsible for transmitting the control data, such as the communication module 112 of the controlling terminal 104 of FIGS. 1-2 and/or shutting down or otherwise disabling a communication module responsible for receiving the control data, such as the communication module 108 of the controlled terminal 102 of FIGS. 1-2.

In some embodiments, the communication link between the controlled terminal and the controlling terminal is closed or terminated in response to a determination that the communication link is experiencing or will likely experience electromagnetic interference including radio-frequency interference. Such interference can occur as a result of simultaneous instances of data transmissions on a busy frequency band. For example, interference may occur during simultaneous transmissions of the control data and the transmission of feedback data that use the same frequency band (e.g., the 2.4 GHz band). Various devices can be used to determine or detect such simultaneous transmissions. For example, the controlling terminal, controlled terminal and/or monitoring terminal may be capable of detecting that a particular frequency band is busy or noisy. Alternatively, the controlling terminal, controlled terminal and/or monitoring terminal may receive an indication from another terminal, or some other device, that the transmission of feedback data is ongoing or will start soon. In some embodiments, the determination may be based on observed characteristics or conditions of the communication environment such as a detected energy level, signal to noise ratio, error rate, and the like. In some other embodiments, the determination may be based on predetermined timing information related to data transmissions. For example, such timing information may indicate predetermined start time, length and/or frequency of the transmission of the control data and/or the feedback data. If it is known that feedback data is being transmitted or will be transmitted soon, then the risk of interference would be high if the controlling terminal were to start or continue transmitting control data using the same frequency band as the transmission of the feedback data. In various embodiments, the determination that simultaneous transmissions of control data and feedback data, and/or the determination to switch the transmission of control data from one communication link to another can be made by one or more processors that reside on the controlling terminal, controlled terminal, monitoring terminal, some other devices, or any combination thereof.

In some embodiments, the communication link between the controlled terminal and the controlling terminal is closed or terminated in response to the establishment of a (wired or wireless) communication link between the controlling terminal and the monitoring terminal, such as the controlling-monitoring communication link 124 of FIGS. 1-2. For example, the controlling terminal may detect signals indicating the establishment of such a link to the monitoring terminal and automatically stops the operation of its transmission module that is configured to transmit control data to the controlled terminal.

In some embodiments, a communication link may be closed or terminated temporarily for a predetermined period of time (e.g., 1, 2, 5, or 10 seconds) or an arbitrary period of time before the communication link is restored. In some instances, the communication link may be shutdown until the risk of interference is reduced. For example, the communication link 120 of FIGS. 1-2 may be restored for control data transmission when the feedback data transmission is stopped or when the feedback data transmission uses a different frequency band than the control data transmission. In various embodiments, the assessment of the communication conditions and risk of interference and/or the decision to restore a closed or terminated communication link may be made by one or more processors that reside on the controlling terminal, controlled terminal, monitoring terminal, some other devices, or any combination thereof.

Still referring to FIG. 3, the process 300 also includes transferring 304 control data from the controlling terminal to the monitoring terminal and transferring 306 the control data from the monitoring terminal to the controlled terminal. Such a reroute of the control data via the monitoring terminal can help reduce or eliminate the above-discussed interference between the transmission of control data and the transmission of feedback data. In particular, the transfer of control data from the controlling terminal to the monitoring terminal can be implemented using a communication link (e.g., controlling-monitoring link 124 of FIGS. 1-2) that that does not interfere or is less likely to interfere with the communication link (e.g., controlled-monitoring link 122 of FIGS. 1-2) that is used for the transmission of the feedback data. For example, the communication link for transferring control data (e.g., communication link 124) can be a wired link (e.g., via a trainer cord) while the communication link for transferring feedback data (e.g., communication link 122) can be a wireless link. Alternatively, both communication links can be wireless links that use different frequency bands.

Furthermore, when the control data is transferred from the monitoring terminal to the controlled terminal, interference reduction techniques such as TDM and FDM may be used to reduce the interference between the transmission of control data and the transmission of feedback data. In an alternative embodiment, the monitoring terminal can use a separate communication link for control data transmission that is different from the communication link for feedback data transmission.

In various embodiments, the control data that is generated by the controlling terminal and received by the monitoring terminal may or may not be saved, displayed, modified or otherwise processed before being transmitted to the controlled terminal. For example, the control data may be modified at the monitoring terminal based on the feedback data received by the monitoring terminal. For example, the control data may be modified based on the feedback data received by the monitoring terminal. In a typical embodiment, the monitoring terminal does not generate its own control data for the controlled terminal. For example, the monitoring terminal may not have a user interface for providing user control to the controlled terminal. However, in some embodiments, the monitoring terminal may be capable of generating control data. Such control data generated by the monitoring terminal may be provided to the controlled terminal in addition or instead of the control data generated by the controlling terminal.

Such transmission of control data via the monitoring terminal may continue for a predetermined period of time (e.g., 1, 2, 5, or 10 seconds) or for an arbitrary period of time before the previously closed communication link is restored between the controlling terminal and the controlled terminal. For example, when the threat of interference is reduced, such as when the transmission of feedback data from the controlled terminal to the monitoring terminal using the same frequency band stops, the control data may be once again transmitted directly from the controlling terminal to the controlled terminal, instead of via the monitoring terminal.

In some embodiments, the transfer of control data from the monitoring terminal to the controlled terminal may occur at a frequency that is different than the transfer of control data from the controlling terminal to the monitoring terminal. In some embodiments, the transfer of control data from the monitoring terminal to the controlled terminal may occur at a slower pace than the transfer of control data from the controlling terminal to the monitoring terminal. For example, the controlling terminal may transmit the control data to the monitoring terminal every K milliseconds (ms) whereas the monitoring terminal transmits control data to the controlled terminal every L ms, where L>K. In other embodiments, the opposite may be true and the transfer of control data from the monitoring terminal to the controlled terminal occurs at a faster pace than the transfer of control data from the controlling terminal to the monitoring terminal, in other words, L>K. In yet other embodiments, L=K. In various embodiments, K and L can be set to any suitable values. For example, in an embodiment, K is 10 milliseconds and L is 21 milliseconds.

Figure 4:
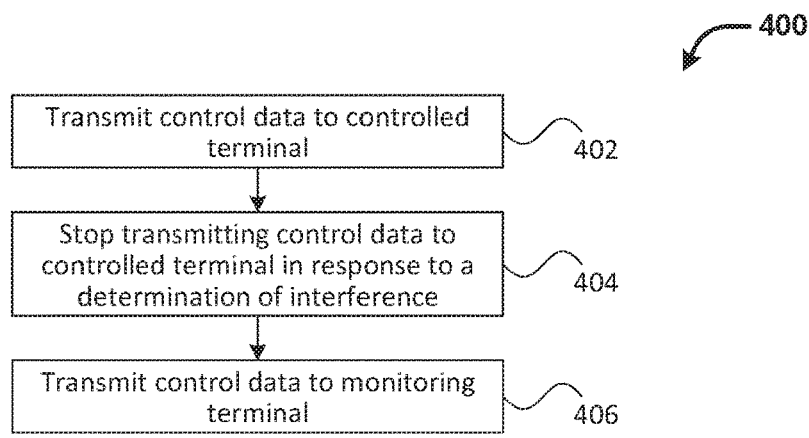
FIG. 4 illustrates an exemplary process for data communication, in accordance with an embodiment.

FIG. 4 illustrates an exemplary process 400 for data communication, in accordance with an embodiment. The process 400 may be implemented by a controlling terminal, such as the controlling terminal 104 discussed in connection with FIGS. 1-2, to transmit control data to reduce or avoid interference.

The process 400 includes transmitting 402 control data to a controlled terminal. Such control data may be generated by the controlling terminal based at least in part on user input via a user interface provided by the controlling terminal. In some cases, the control data may also come from other external sources. The transmission of the control data may be over a communication link such as the communication link 120 discussed in connection with FIGS. 1-2, using a specific frequency band such as the 2.4 GHz band.

In response to a determination of interference, the transmission of the control data using the existing communication link is stopped 404. The determination of interference may indicate a current interference or a potential risk of interference to the transmission of the control data. The determination may be made based on the current or predicted traffic condition of the communication channels. For instance, if the feedback data is being transmitted or will be transmitted at the same time as the control data transmission using the same frequency band, the risk of interference may be high. In various embodiments, such a determination of interference may be performed by the controlling terminal, the monitoring terminal, controlled terminal, or another suitable device. Based on the determination of interference, the transmission of the control data can be stopped, for example, by stopping a communication module from transmitting the control data to the controlled terminal. In some embodiments, the operation of the receiving communication module at the controlled terminal is also stopped.

Finally, the process 400 includes transmitting 406 the control data to the monitoring terminal. In some embodiments, the transmission is carried out in a way that reduces interference, for example, with the transmission of the feedback data. For example, the communication link for transferring the control data from the controlling terminal to the monitoring terminal can be a wired link (e.g., trainer cord) whereas the communication link for transferring the feedback data can be a wireless (e.g., radio) link. Alternatively, the communication link for transferring the feedback data and the communication link for transferring the control data from the controlling terminal to the monitoring terminal can both be wireless (e.g., radio) links that use different frequency bands. Subsequently, the control data can be transmitted to the controlled terminal as described in FIG. 5.

Figure 5:
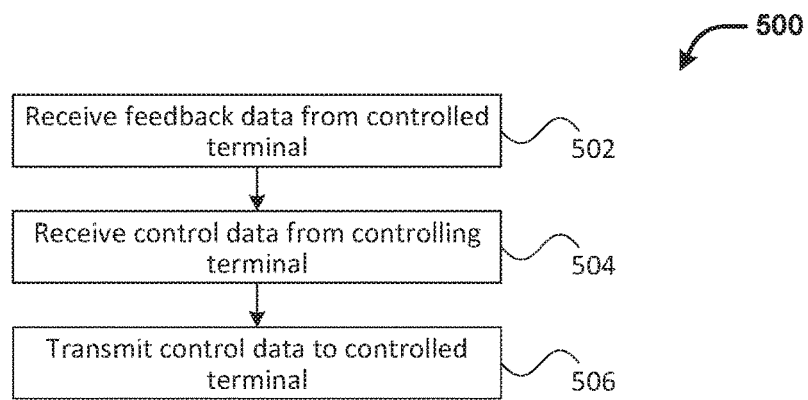
FIG. 5 illustrates an exemplary process for data communication, in accordance with an embodiment.

FIG. 5 illustrates an exemplary process 500 for data communication, in accordance with an embodiment. The process 500 may be implemented by a monitoring terminal, such as the monitoring terminal 106 discussed in connection with FIGS. 1-2, to receive feedback data from a controlled terminal, receiving control data from a controlling terminal and transmitting the control terminal to the controlled terminal.

The process 500 includes receiving 502 feedback data from a controlled terminal, such as the controlled terminal 102 discussed in FIGS. 1-2. The feedback data may be transferred using a communication link such as the communication link 122 discussed in connection with FIGS. 1-2. The communication link may be a wireless link utilizing a specific frequency band such as the 2.4 GHz band. The feedback data may be received by a communication module such as the communication module 118 illustrated in FIG. 1. The communication module may be capable of two-way communication with the controlled terminal.

Additionally, the process 500 includes receiving 504 control data from a controlling terminal. The control data may be received over a separate communication link such as the communication link 124 illustrated in FIG. 1. Such a communication link between the controlling terminal and the monitoring terminal may be adapted to provide interference avoidance with the communication link between the monitoring terminal and the controlled terminal. For example, in an embodiment, communication link for receiving the control data may be over a wired connection (e.g., via training interferences) while the communication link for receiving the feedback data may be over a wireless connection. Alternatively, the communication link for receiving the control data and the communication link for receiving the feedback data may both be wireless but use different frequency bands to avoid interference with each other.

In some embodiments, the monitoring terminal may be configured to start receiving control data from a specific communication link upon an indication to do so. The indication may be provided externally by the controlling terminal, the controlled terminal or any other suitable device. The indication may also be provided by an internal process running within the monitoring terminal itself. Regardless of whether the indication is provided externally or internally, the indication to start receiving control data can be based on one or more communication conditions indicative of interference, such as whether there is simultaneous transmission of control data and feedback data using the same frequency band, signal to noise ratio, error rate, or the like. In other embodiments, the indication to start receiving control data may be simply based on the presence of incoming data (e.g., via the trainer port).

Once the control data is received from the controlling terminal, the control data can be transmitted 506 to the controlled terminal, thereby controlling the operations of the controlled terminal. In some embodiments, the control data may be transmitted to the controlled terminal without any modification. Alternatively, the control data may be modified or otherwise processed before being transmitted to the controlled terminal, for example, based on feedback data received therefrom. When the transmission of the control data and the transmission of the feedback data occur over the same communication link, such as the communication link 122 illustrated in FIGS. 1-2, various techniques such as TDM, FDM, and the like can be used to avoid interference between the transmissions. Therefore, in some embodiments, the monitoring terminal only receives feedback data when there is no interference from the transmission of control data.

Figure 6:
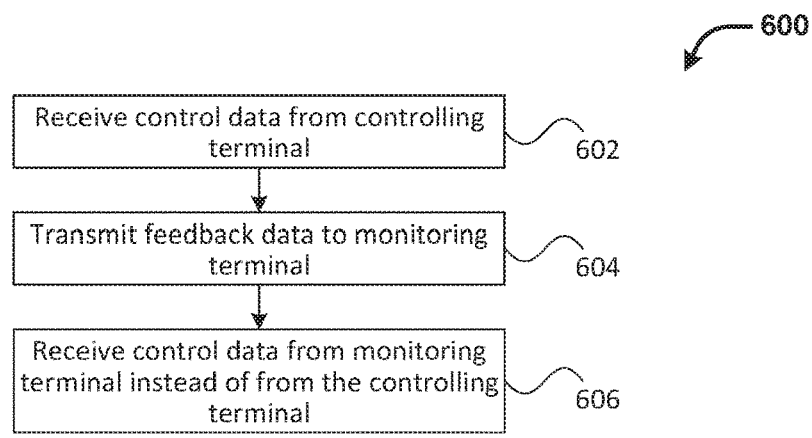
FIG. 6 illustrates an exemplary process for data communication, in accordance with an embodiment.

FIG. 6 illustrates an exemplary process 600 for data communication, in accordance with an embodiment. The process 600 may be implemented by a controlled terminal, such as the controlled terminal 102 discussed in connection with FIGS. 1-2 to receive control data and transmit feedback data.

The process 600 includes receiving 602 control data from a controlling terminal, such as the controlling terminal 104 illustrated in FIG. 1. The control data may be transferred using a communication link such as the communication link 120 discussed in connection with FIGS. 1-2. The communication link may be a wireless link utilizing a specific frequency band such as the 2.4 GHz band. The control data may be received by a communication module such as the communication module 108 illustrated in FIG. 1, capable of supporting only one-way communication with the controlling terminal. Alternatively, the communication module 108 may be capable of supporting two-way communication.

The process 600 also includes transmitting 604 feedback data to a monitoring terminal, such as the monitoring terminal 106 illustrated in FIG. 1. The feedback data may be transferred using a communication link such as the communication link 122 discussed in connection with FIGS. 1-2. The communication link may be a wireless link utilizing the same frequency band as the communication link between the controlled terminal and the controlling terminal (e.g., the 2.4 GHz band). The feedback data may be transmitted by a communication module such as the communication module 110 illustrated in FIG. 1. The communication module may be capable of supporting two-way communication with the monitoring terminal.

Finally, the process 600 includes receiving 606 control data from the monitoring terminal instead of from the controlling terminal. The switch may occur based on a determination that the control data is being received at the same time when the feedback data is being transmitted using the same frequency band. For example, the determination may be implemented by one or more processors that is located onboard the controlled terminal or located elsewhere. In response to such a determination, a terminal of communication link between the controlled terminal and the controlling terminal may be effected by the controlling terminal (e.g., by shutting down the transmitter of control data), the controlled terminal (e.g., by shutting down the receiver of control data), or both. Subsequently, the control data is received from the monitoring terminal instead of from the controlling terminal, such as using the same communication link used for feedback data transmission. Interference avoidance techniques such as TDM and FDM may be used for the transmission of the control data and feedback data to prevent interference of data transmissions on the same communication link. Therefore, in some embodiments, the monitoring terminal only receives feedback data when there is no interference from the transmission of control data. As discussed above, the control data that is received from the monitoring terminal is typically generated by the controlling terminal but transmitted to the monitoring terminal using a communication link that does not interfere with the transmission of the feedback data (e.g., via trainer interfaces, or using a different frequency band). In some cases, the control data received by the controlled terminal may have been modified or otherwise processed by the monitoring terminal.

Figure 7:
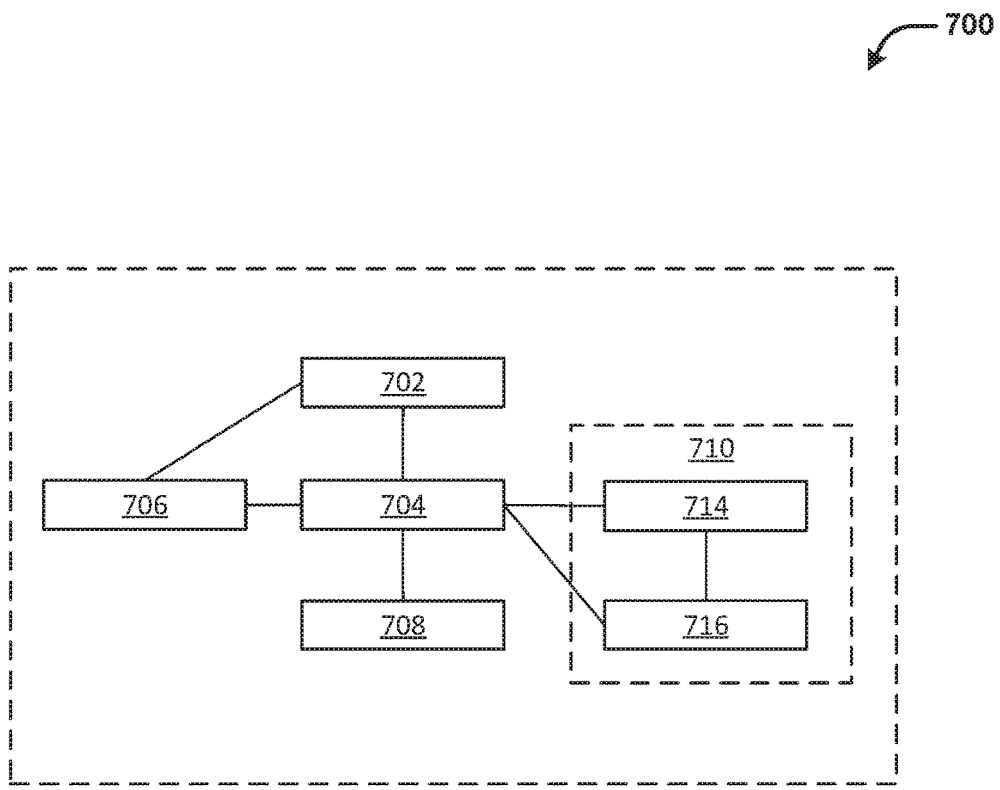
FIG. 7 illustrates exemplary controlled terminal, in accordance with some embodiments.

FIG. 7 illustrates exemplary controlled terminal 700, in accordance with some embodiments. The controlled terminal 700 can be used in combination with any suitable embodiment of the systems, devices, and methods disclosed herein. The controlled terminal 700 can include a sensing module 702, processing unit 704, memory 706, control module 708, and one or more communication modules 710.

The sensing module 702 can utilize different types of sensors that collect information relating to the controlled terminal in different ways. Different types of sensors may sense different types of signals or signals from different sources. For example, the sensors can include inertial sensors, GPS sensors, proximity sensors (e.g., LIDAR), or vision/image sensors (e.g., a camera). The sensing module 702 can be operatively coupled to a processing unit 704 having one or more processors.

The processing unit 704 can have one or more processors, such as a programmable processor (e.g., a central processing unit (CPU)). The processing unit 704 can be operatively coupled to a memory 706. The memory 706 can include transitory and/or non-transitory storage media configured to store data, and/or logic, code, and/or program instructions executable by the processing unit 704 for performing one or more routines or functions. The memory can include one or more memory units (e.g., removable media or external storage such as an SD card, random access memory (RAM), read-only memory (ROM), and the like). In some embodiments, data from the sensing module 702 can be directly conveyed to and stored within the memory units of the memory 706. The memory units of the memory 706 can store logic, code and/or program instructions executable by the processing unit 704 to perform any suitable embodiment of the methods described herein. For example, the processing unit 704 can be configured to execute instructions causing one or more processors of the processing unit 704 to prepare data (e.g., sensor data acquired by the sensing module) for transmission (e.g., by encoding and/or modulating the data), process data received by the communication modules 710 (e.g., by decoding and/or demodulating received control data), cause the communication modules 710 to transmit and/or receive data, and the like. For example, the processing unit 704 can be configured to execute instructions for implementing the process 600 discussed in FIG. 6. The memory units can store sensor data from the sensing module to be processed by the processing unit 704. In some embodiments, the memory units of the memory 706 can be used to store the processing results produced by the processing unit 704. Although FIG. 7 depicts a single processing unit 704 and a single memory 706, one of skill in the art would appreciate that this is not intended to be limiting, and that the system 700 can include a plurality of processing units and/or memory units of the memory.

In some embodiments, the processing unit 704 can be operatively coupled to a control module 708 configured to control a state of the controlled terminal. For example, the control module 708 can be configured to control the propulsion mechanisms of the controlled terminal to adjust the spatial disposition, velocity, and/or acceleration of the controlled terminal with respect to six degrees of freedom. Alternatively or in combination, the control module 708 can control the state of one or more components of the controlled terminal (e.g., the sensing module) or objects carried by the controlled terminal (e.g., a payload device such as a camera). In some embodiments, the control module can be controlled by control data provided from an external device such as a controlling terminal or monitoring terminal as discussed herein. The control data may be used to control the propulsion mechanism, the sensing module, or other components of the controlled terminal. In some cases, the control data is critical for controlling operations of the controlled terminal and needs to be transmitted and received correctly.

The processing unit 704 can be operatively coupled to communication modules 710 configured to transmit and/or receive data from one or more remote devices (e.g., controlling terminal, monitoring terminal, base station, handheld remote controlling terminal, and the like). For example, the communication modules 710 can transmit and/or receive one or more of sensor data from the sensing module 702, processing results produced by the processing unit 704, control data, synchronization information, and the like. The communication modules 710 can include a transmitter 714 and a receiver 716 respectively configured to transmit and receive data to and from a remote device. In some embodiments, the transmitter 714 is also configured to receive data (e.g., control data) from a remote device (e.g., monitoring terminal). In some embodiments, the communication module can include a transceiver that combines the functionalities of the transmitter and the receiver. In some embodiments, the transmitter and the receiver can communicate with each other as well as with the processing unit 704 or other components described herein.

Figure 8:
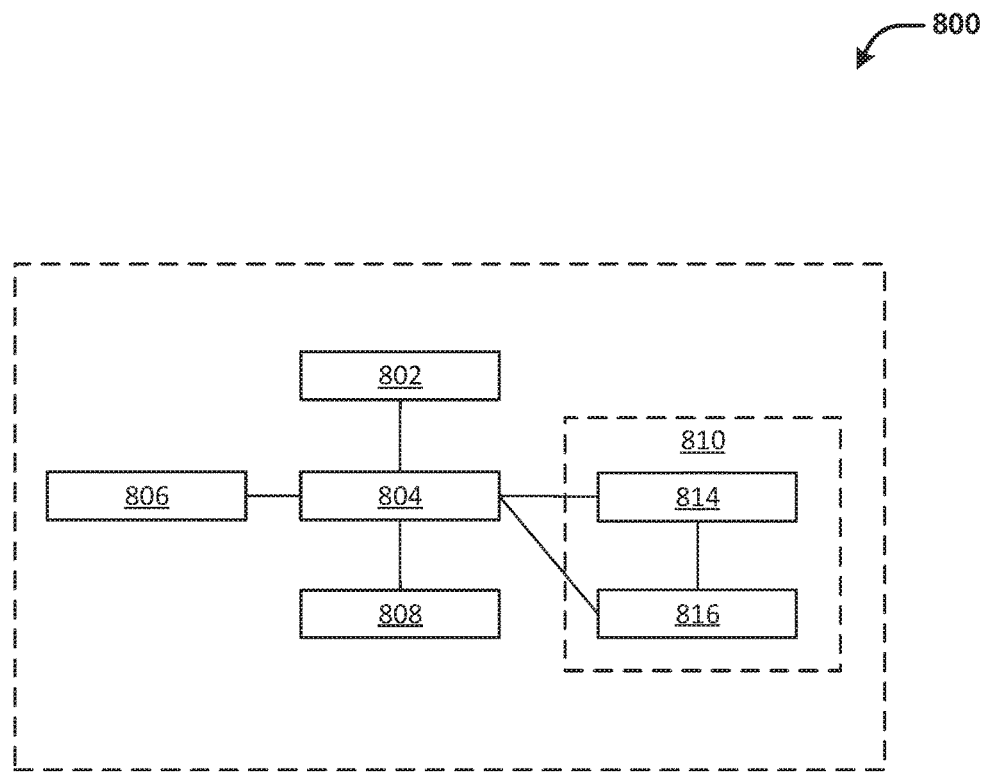
FIG. 8 illustrates exemplary controlling terminal, in accordance with some embodiments.

FIG. 8 illustrates exemplary controlling terminal 800, in accordance with some embodiments. The controlling terminal 800 can be used to remotely control a controlled terminal such as described in FIG. 7. The controlling terminal 800 can be disposed on or affixed to a support platform. For example, the controlling terminal 800 can include one or more computing devices in base station. Alternatively, the controlling terminal 800 can be a handheld or wearable device. For example, the controlling terminal can include a smartphone, tablet, laptop, computer, glasses, gloves, helmet, microphone, or suitable combinations thereof. In an embodiment, the controlling terminal is an off-the-shelf remote controller with no specialized hardware. For example, the controlling terminal may be incapable of receiving feedback data from the controlled terminal. In another embodiment, specialized hardware may be provided to implement the functionalities described herein. In an illustrative embodiment, the controlling terminal 800 can include an input module 802, processing unit 804, memory 806, one or more communication modules 810, and optional display module 808.

The input module 802 can be used by a user provide commands usable for controlling an object. The input module may include a keyboard, mouse, joystick, touchscreen, microphone, visual sensor, proximity sensor, or the like. A user may use the input module to interact with the controlling terminal such as by joystick movement, button press, keyboard strokes, mouse clicks or movement, voice control, facial expression, body movement or gesture control, position control (e.g., via a movement, location or tilt of the controlling terminal), or a combination thereof.

The controlling terminal 800 can optionally include a display 808 for displaying information such as visualization of control command input by the user, instructions or guidance for the user, information about the object being controlled, or any other information. In some embodiments, the controlling terminal does not include a display.

The input module 802 and the optional display 808 can be connected a processing unit 804, which is operatively connected to a memory 808. The processing unit 804 and memory 806 can be similar to the processing unit 704 and memory 706 described in FIG. 7. In particular, the memory 806 can include transitory and/or non-transitory storage media configured to store data, and/or logic, code, and/or program instructions executable by the processing unit 804 for performing one or more routines or functions described herein, such as the process 400 described in FIG. 4. In addition, the memory 806 can be used to store control data to be sent to the controlled terminal, for example, based on user input provided via the input module 802.

The processing unit 804 can be operatively coupled to communication modules 810 configured to transmit data to one or more external devices (e.g., controlled terminal, monitoring terminal). For example, the communication modules 810 can include a communication module 814 for transmitting control data to the controlled terminal and another communication module 816 for transmitting control data to the monitoring terminal. In some embodiments, the communication modules can communicate with each other as well as with the processing unit 804 or other components described herein. The communication modules may support different methods of communication. For example, the communication module 814 may be configured to support wireless communication (e.g., via radio frequency); whereas the communication module 816 may be configured to support wired communication (e.g., via a training interface as described herein or any other suitable port). Alternatively, the communication modules may support the same method of communication (e.g., wireless communication) but with different characteristics (e.g., different frequency bands). In some embodiments, the communication modules 810 may be capable of supporting only one-way communication (e.g., transmission of data). In some other embodiments, at least one of the communication modules 810 may be capable of supporting two-way communication (e.g., transmission and receiving of data).

Figure 9:
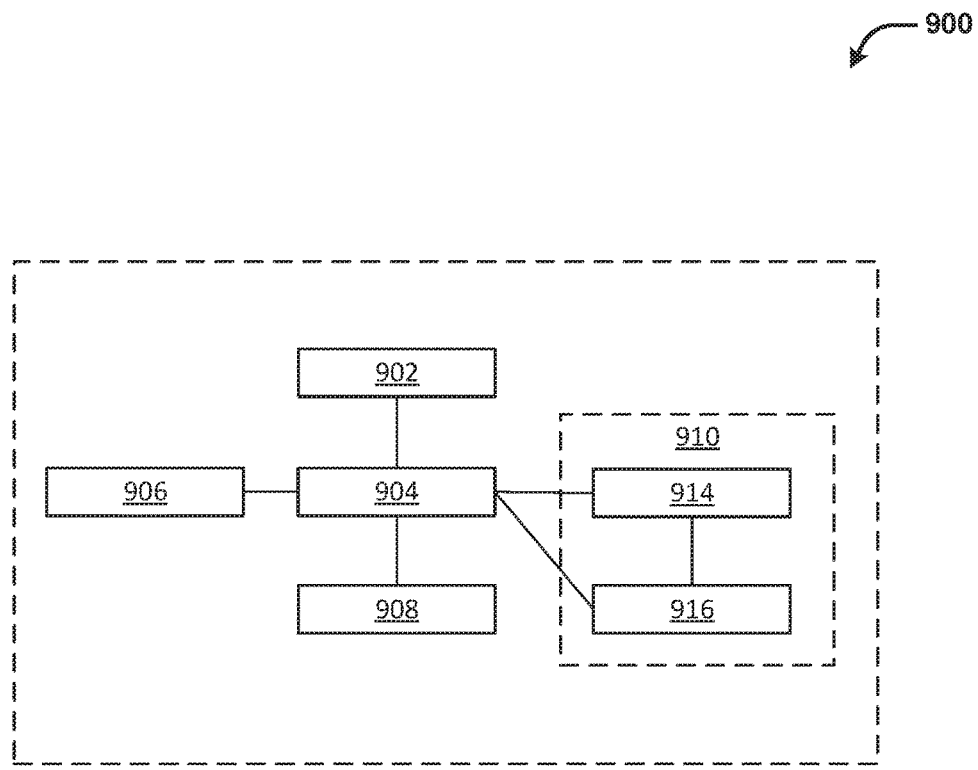
FIG. 9 illustrates exemplary monitoring terminal, in accordance with some embodiments.

FIG. 9 illustrates exemplary monitoring terminal 900, in accordance with some embodiments. The monitoring terminal 900 can be used receive feedback data from a remote terminal such as from a controlled terminal described in FIG. 7. Additionally, as described herein, the monitoring terminal 900 can be used to receive control data from a controlling terminal such as described in FIG. 8 and transmit the control data to the controlled terminal. The monitoring terminal 900 can be disposed on or affixed to a support platform. For example, the monitoring terminal 900 can include one or more computing devices in base station. Alternatively, the monitoring terminal 900 can be a handheld or wearable device. For example, the monitoring terminal can include a server, desktop, smartphone, tablet, laptop, glasses, gloves, helmet, or suitable combinations thereof. In an embodiment, the monitoring terminal is an off-the-shelf device with no specialized hardware. For example, the monitoring terminal may be incapable of generating control data based on user input. Alternatively, the monitoring terminal may be capable of generating control data based on user input. In another embodiment, specialized hardware may be provided to implement the functionalities described herein. In an illustrative embodiment, the monitoring terminal 900 can include an optional input module 902, processing unit 904, memory 906, one or more communication modules 910, and display 908.

The processing unit 904 and memory 906 can be similar to the processing unit 804 and memory 806 described in FIG. 7. In particular, the memory 906 can include transitory and/or non-transitory storage media configured to store data, and/or logic, code, and/or program instructions executable by the processing unit 904 for performing one or more routines or functions described herein, such as the process 500 described in FIG. 5. In addition, the memory 906 can be used to store feedback data received from the controlled terminal and/or control data received from the controlling terminal.

The processing unit 904 can be operatively coupled to communication modules 910 configured to receive and/or transmit data. In some embodiments, the communication modules can communicate with each other as well as with the processing unit 804 or other components described herein. The communication modules 910 include a communication module 914 for receiving feedback data from the controlled terminal and for transmitting control data to the controlled terminal. Thus, the communication module 914 is capable of two-way communication with the controlled terminal. The control data may be generated by the controlling terminal, the monitoring terminal, or by a combination of both. The communication modules 910 also include a communication module 916 for receiving control data from the controlling terminal. In some embodiments, the communication module 916 may be capable of only one-way communication. In other embodiments, the communication module 916 may be capable of supporting two-way communication. The communication modules may support different methods of communication. For example, the communication module 914 may be configured to support wireless communication (e.g., via radio frequency); whereas the communication module 916 may be configured to support wired communication (e.g., via a training interface as described herein or any other suitable port). Alternatively, the communication modules may support the same method of communication (e.g., wireless communication) but with different characteristics (e.g., different frequency bands).

The display 908 can be operatively connected to the processing unit 904 can be used for viewing information of a remote object such as the controlled terminal described in FIG. 7. The information provided by the display 908 may be based on feedback data received from the controlled terminal. For example, the display 908 can be configured to display information of the controlled terminal with respect to position, translational velocity, translational acceleration, orientation, angular velocity, angular acceleration, or any suitable combinations thereof. In some embodiments, the display 908 can be used to display information acquired or captured by the controlled terminal such as sensor data (e.g., images recorded by a camera or other image capturing device).

Optionally, the monitoring device 900 can include an input module 902 for users to provide instructions. However, the input module 902 may or may not be similar to the input module 802 described in FIG. 8. For example, unlike the input module 802 of FIG. 8, the input module 902 may not allow a user to provide control data usable for controlling the controlled terminal.

The systems and methods described herein can be applied to communicate a wide variety of controlled terminals. In some implementations, the controlled terminal may be movable objects. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. The movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user. For example, the movable object may be controlled with the aid of a controlling terminal and/or monitoring terminal. The user may be remote from the movable object, or on or in the movable object while using the controlling terminal and/or monitoring terminal to control the movable object. The movable object can an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 700 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 700 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 700 kg. The weight of the movable object may be less than or equal to about: 700 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 700 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 10:
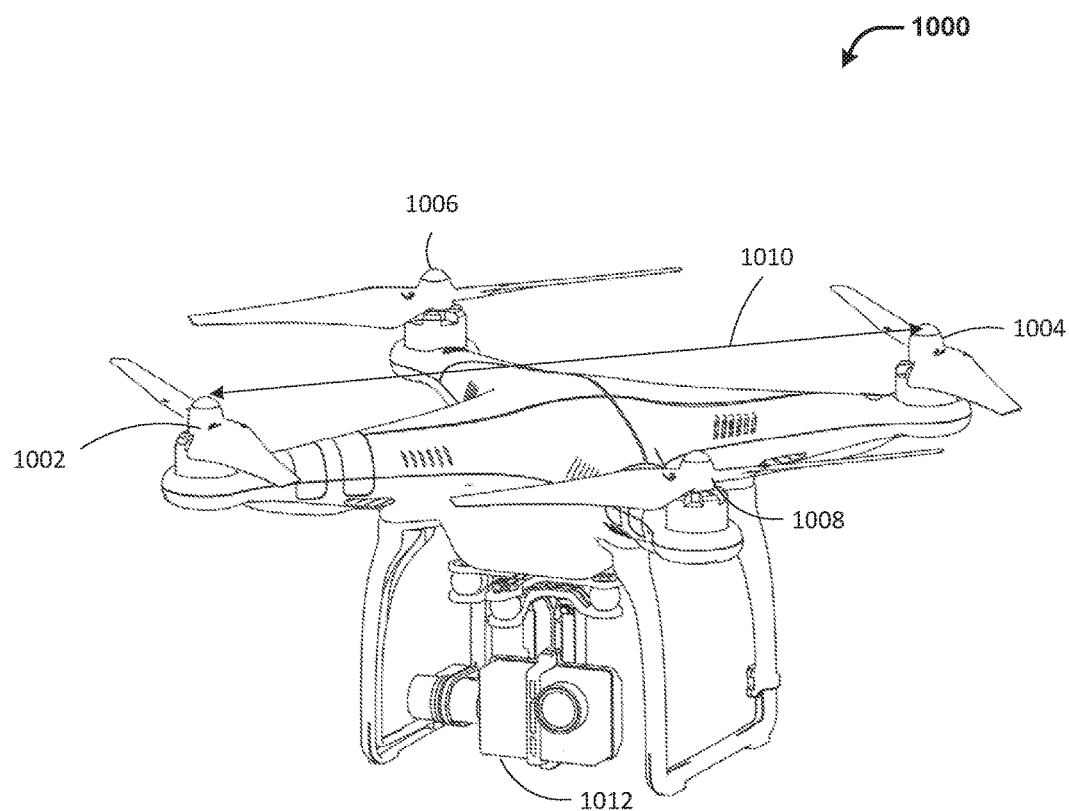
FIG. 10 illustrates an unmanned aerial vehicle (UAV), in accordance with some embodiments.

FIG. 10 illustrates an unmanned aerial vehicle (UAV) 1000, in accordance with some embodiments. The UAV may be an example of a movable object as described herein. The UAV 1000 can include a propulsion system having four rotors 1002, 1004, 1006, and 1008. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than equal to 5 m. In some embodiments, the length 1010 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load 1012. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. For example, the payload may be an image capturing device. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. For example, the communication may be with a monitoring terminal described herein. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An unmanned aerial vehicle (UAV) comprising:
a receiver configured to directly receive control data from a controlling terminal via a first communication link, the control data being used to control operations of the UAV;
a transceiver configured to transmit feedback data to a monitoring terminal via a second communication link, the monitoring terminal being located remotely from the UAV; and
one or more processors, individually or collectively, configured to terminate the first communication link based on a determination that the first communication link is experiencing or will likely experience interference.

2. The UAV of claim 1, wherein the transceiver is further configured to receive the control data from the monitoring terminal via the second communication link in response to the first communication link being terminated.

3. The UAV of claim 2, wherein the control data is modified at the monitoring terminal based on the feedback data.

4. The UAV of claim 2, wherein the transceiver is further configured to transmit the feedback data to the monitoring terminal and receive the control data from the monitoring terminal based on an interference avoidance technique.

5. The UAV of claim 4, wherein the interference avoidance technique includes at least one of a time division multiplexing (TDM) scheme or a frequency division multiplexing (FDM) scheme.

6. The UAV of claim 1, wherein the one or more processors are configured to terminate the first communication link by disabling the receiver.

7. The UAV of claim 1, wherein the determination is based on detecting simultaneous transmissions of the control data over the first communication link and of the feedback data over the second communication link.

8. The UAV of claim 7, wherein the simultaneous transmissions are detected by:
   detecting that a particular frequency band is busy or noisy, or
   receiving an indication that the transmission of the feedback data is ongoing or will start soon.

9. The UAV of claim 1, wherein the determination is based on observed characteristics or conditions of a communication environment.

10. The UAV of claim 1, wherein the determination is based on predetermined timing information related to data transmissions.

11. The UAV of claim 1, wherein the one or more processors are further configured to terminate the first communication link temporarily for a predetermined period of time before reactivating the first communication link or for a period of time until a risk of interference of data transmission is reduced.

12. The UAV of claim 1, wherein the control data is generated at the control terminal and the control terminal is located remotely from the UAV.

13. A method for communicating with an unmanned aerial vehicle (UAV) comprising:
   directly receiving, by a receiver of the UAV, control data from a controlling terminal via a first communication link, the control data being used to control operations of the UAV;
   transmitting, by a transceiver of the UAV, feedback data to a monitoring terminal via a second communication link, the monitoring terminal being located remotely from the UAV; and
   terminating, by one or more processors of the UAV individually or collectively, the first communication link based on a determination that the first communication link is experiencing or will likely experience interference.

14. The method of claim 13, further comprising:
   receiving the control data from the monitoring terminal via the second communication link in response to the first communication link being terminated.

15. The method of claim 14, wherein the control data is modified at the monitoring terminal based on the feedback data.

16. The method of claim 13, further comprising:
   reactivating the first communication link.

17. The method of claim 16, wherein the first communication link is reactivated after a predetermined period of time or after a risk of interference of data transmission is reduced.

18. The method of claim 13, wherein the control data is generated at the control terminal and the control terminal is located remotely from the UAV.

* * * * *